125,787

UNITED STATES PATENT OFFICE.

BENJAMIN MORISON, OF PHILADELPHIA, PENNSYLVANIA.

IMPROVEMENT IN THE MANUFACTURE OF METAL-COATED SHEET-IRON.

Specification forming part of Letters Patent No. 123,787, dated February 20, 1872.

Specification describing certain Improvements in Sheet-Iron and the Process therefor, invented by BENJAMIN MORISON, of the city of Philadelphia, in the State of Pennsylvania.

The nature of my invention consists in deoxidizing the scale oxide adherent to sheet-iron, and amalgamating, blending, or intimately uniting with it any of the softer and more fusible metals; the object of my invention being the rendering of the said scale oxide more flexible, soft, adherent, and less liable to rust, and the sheet-iron also more perfectly annealed and flexible.

To enable others skilled in the art to which it appertains to make, construct, compound, and use my invention, I will proceed to describe the same in the full, clear, concise, and exact terms required by the act of Congress in that case made and provided.

It is important to the best results, in carrying out my invention, that the sheets be made of the best charcoal bloom-iron, and that the scale oxide thereon be even or of uniform thickness and unbroken; and in order to produce such a scale oxide it is recommended that the usual rough and imperfect scale be removed—by means of a weak acid in the usual manner practiced in the process of coating sheet-iron with zinc by immersion—and that the sheets be then passed between a pair of smooth pressure-rolls, and finally subjected to a sufficient heat to produce thereon a new and uniform scale oxide. Having an iron box prepared of sufficient capacity to hold a number of the sheets slightly isolated from each other, and provided with a lid or cover, and also with a hole near the bottom of one end for the insertion of a gas-pipe, place the sheets successively in the box, isolating them by means of numerous small fragments of hard-burned clay or other suitable incombustible material; apply the lid, and lute the intervening joints with plastic clay. Now place the box in the chamber of a furnace adapted to gradually bring it up to a low or scarcely-visible red heat; insert the nozzle of the gas-pipe into the hole in the box, and introduce hydrogen gas under a pressure about equal to the propelling power required for the illuminating gas of cities. As the clay dries, it shrinks and leaves cracks or fissures sufficient for the slow escape of the compressed gas and the aqueous vapor produced by the combination of the oxygen of the scale and the hydrogen. In the course of an hour the scale oxide will have become deoxidized, and the box may then be withdrawn from the hot chamber and allowed to cool gradually—the hydrogen in the meantime continuing to pass through it as before to preclude the entrance of atmospheric air—and, after the sheets have become cool enough to handle, the gas should be stopped off, and the sheets taken out and treated as follows, viz.: Having prepared saturated or strong aqueous solutions, say, of sulphate of zinc, chloride of zinc, chloride of tin, acetate of zinc, acetate of lead, and of any other readily-fusible metal that will amalgamate, unite, or combine with the deoxidized scale on the iron at a strong or bright-red heat under hydrogen or carbureted hydrogen gas, immerse the deoxidized sheets in either one or a mixture of two or more of the said solutions for five or ten minutes, or apply the same by rubbing it on by means of a sponge or soft brush; let the excess of solution drain off and the remainder crystallize or dry upon the surface of the sheets. Now replace them in the box in the same isolated manner before described; replace and lute the cover, and place the box in the heated chamber of the furnace; then introduce the hydrogen gas, and slowly heat up to a scarcely-visible red, maintaining the said low heat for, say, half an hour, more or less, to allow a perfect reduction of the oxide of the applied solution; after which the heat should be increased to a bright red, or a heat a few degrees above that which may be required to fuse the now-reduced softer metal, and cause the same to amalgamate, blend, or unite with the deoxidized and consequently soft and porous scale on the sheet-iron. The box may now be withdrawn from the hot chamber of the furnace and allowed to cool slowly, with the hydrogen gas continuously passing through it to preclude the entrance of atmospheric air, until the sheets have become cold enough to be handled, when the gas should be shut off and the sheets taken out of the box.

If brightness of the surface be desired, it will be readily produced by passing the sheets severally between and in contact with a pair of cylindrical rapidly-rotating bristle-brushes; and, if afterward intended to be put up in packs for storage or shipment, the sheets may, as a further protection against dampness, be dipped into any suitable hydrocarbon oil, and then the superfluous portion drained or wiped off. The solution of the sulphate or of the acetate of zinc forms, with the deoxidized scale on the iron, an excellent coating. About three parts of the solution of chloride of zinc mixed with two parts of the solution of chloride of tin make, with the deoxidized scale on the iron, an excellent flexible coating of a whiter color. Three parts of the solution of the acetate of zinc mixed with two parts of the solution of the acetate of lead, and one part of the solution of the chloride of tin make, with the deoxidized scale on the iron, a very suitable coating for sheet-iron intended to be used in the construction of stoves, stove-pipes, coal-hods, &c.; but, as the predominant metal in the coating is the deoxidized scale oxide of iron, the number and proportions of the solutions of whatever metals intended to be applied thereto may be increased and varied as the coating desired may require.

Sheet-iron treated as above described will be soft and flexible or thoroughly annealed, and the coating more adherent, soft, and flexible, or not liable to crack or scale off, either in bending, seaming, or double-seaming the sheet, and much less liable to rust than any of the sheet-iron hitherto produced in this country.

To economize time, the process may be expedited by rubbing the solution upon the surface of the scale and drying it thereon before the sheets are put into the box to be deoxidized, thus making one heating sufficient; but, as the deoxidized scale is porous, the solution saturates or penetrates it, and is, therefore, more readily applied than it can be upon the scale oxide; and, besides, there is a certainty in the former case that the scale is thoroughly deoxidized before the softer metals are reduced and fused—a certainty which is of the highest importance, and may not always be attainable during the one-heat process.

The oxides of the softer metals may be, if desired, mixed and applied with lard or oil, and carbureted hydrogen gas may be used instead of hydrogen alone; but the presence of carbon not only tends to stain or darken the coating, but also to carbonize the iron.

I claim as my invention—

1. The process, consisting in deoxidizing the scale oxide adhering to sheet-iron, and amalgamating, blending, or intimately uniting it with any of the softer or more fusible metals, substantially as and for the purpose hereinbefore described.

2. As a new article of manufacture, sheet-iron having a surface-coating consisting of the deoxidized scale oxide amalgamated, blended, or united with any of the softer or more fusible metals, substantially as and for the purpose hereinbefore set forth and described.

BENJ. MORISON.

Witnesses:
WM. H. MORISON,
JACOB R. MASSEY.